(12) United States Patent
Narla

(10) Patent No.: US 10,340,702 B2
(45) Date of Patent: Jul. 2, 2019

(54) OPTIMIZER BATTERY PV ENERGY GENERATION SYSTEMS

(71) Applicant: SolarCity Corporation, San Mateo, CA (US)

(72) Inventor: Sandeep Narla, San Jose, CA (US)

(73) Assignee: SolarCity Corporation, San Mateo, CA (US)

(*) Notice: Subject to any disclaimer, the term of this patent is extended or adjusted under 35 U.S.C. 154(b) by 213 days.

(21) Appl. No.: 15/235,051

(22) Filed: Aug. 11, 2016

(65) Prior Publication Data

US 2018/0048160 A1  Feb. 15, 2018

(51) Int. Cl.
| | |
|---|---|
| H02J 3/30 | (2006.01) |
| H02J 3/34 | (2006.01) |
| H02J 7/06 | (2006.01) |
| H02J 3/38 | (2006.01) |
| H02S 40/38 | (2014.01) |
| H02S 40/32 | (2014.01) |
| H02J 3/46 | (2006.01) |
| H02J 7/35 | (2006.01) |
| H02J 5/00 | (2016.01) |

(52) U.S. Cl.
CPC .......... *H02J 3/385* (2013.01); *H02J 3/383* (2013.01); *H02J 3/46* (2013.01); *H02J 5/00* (2013.01); *H02J 7/35* (2013.01); *H02S 40/32* (2014.12); *H02S 40/38* (2014.12); *Y02B 10/14* (2013.01); *Y02E 10/563* (2013.01); *Y02E 10/566* (2013.01)

(58) Field of Classification Search
CPC ..... H02J 3/385; H02J 7/35; H02J 3/46; H02S 40/38; H02S 40/32
See application file for complete search history.

(56) References Cited

U.S. PATENT DOCUMENTS

| | | | |
|---|---|---|---|
| 8,227,937 B2 | 7/2012 | Barlock et al. | |
| 8,502,129 B2 | 8/2013 | Miller et al. | |
| 9,866,098 B2* | 1/2018 | Yoscovich | H02M 1/00 |
| 2004/0021468 A1* | 2/2004 | Dougherty | G01R 31/3631 |
| | | | 324/429 |
| 2005/0029867 A1* | 2/2005 | Wood | H02J 1/08 |
| | | | 307/10.1 |
| 2011/0089886 A1 | 4/2011 | Dubovsky | |
| 2011/0232714 A1* | 9/2011 | Bhavaraju | H02J 3/385 |
| | | | 136/244 |
| 2011/0266993 A1* | 11/2011 | Vaish | H01M 10/425 |
| | | | 320/101 |
| 2011/0313584 A1* | 12/2011 | Carson | H02P 9/04 |
| | | | 700/295 |
| 2014/0129040 A1* | 5/2014 | Emadi | G06Q 50/06 |
| | | | 700/291 |

(Continued)

*Primary Examiner* — Alfonso Perez Borroto
*Assistant Examiner* — Esayas G Yeshaw
(74) *Attorney, Agent, or Firm* — Kilpatrick Townsend & Stockton LLP

(57) ABSTRACT

Embodiments disclose an energy generation system including a photovoltaic (PV) array having a plurality of PV modules for generating direct current (DC) power, a plurality of Opti-battery packs coupled to the PV array, where each Opti-battery pack is coupled to a respective PV module and configured to receive DC power from the respective PV module, and an inverter configured to receive DC power from the plurality of Opti-battery packs and to convert the DC power to alternating current (AC) power.

18 Claims, 10 Drawing Sheets

(56) References Cited

U.S. PATENT DOCUMENTS

| | | |
|---|---|---|
| 2014/0265998 A1 | 9/2014 | Nielson et al. |
| 2014/0285023 A1* | 9/2014 | Garg .................... G05F 1/67 |
| | | 307/82 |
| 2016/0092776 A1* | 3/2016 | Hooshmand ...... H01M 10/4207 |
| | | 706/46 |
| 2016/0111915 A1* | 4/2016 | Sellin ..................... H02J 7/35 |
| | | 307/66 |
| 2016/0329719 A1* | 11/2016 | Meyer .................... H02J 3/383 |
| 2017/0104346 A1* | 4/2017 | Wenzel ................... H02J 7/007 |
| 2017/0117744 A1* | 4/2017 | Ye ......................... H02S 40/38 |

* cited by examiner

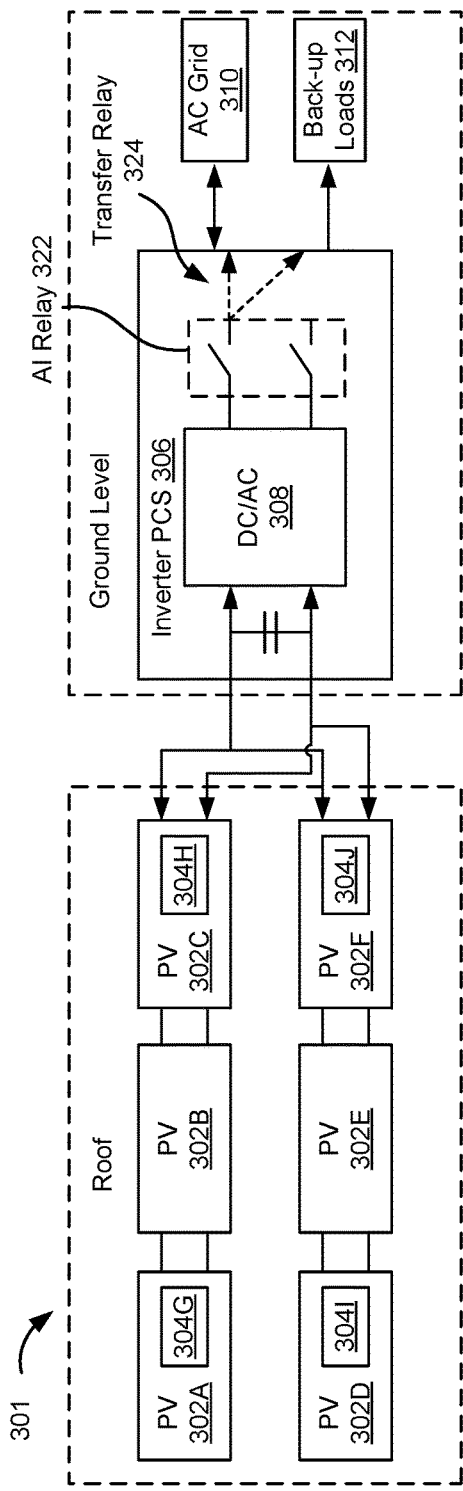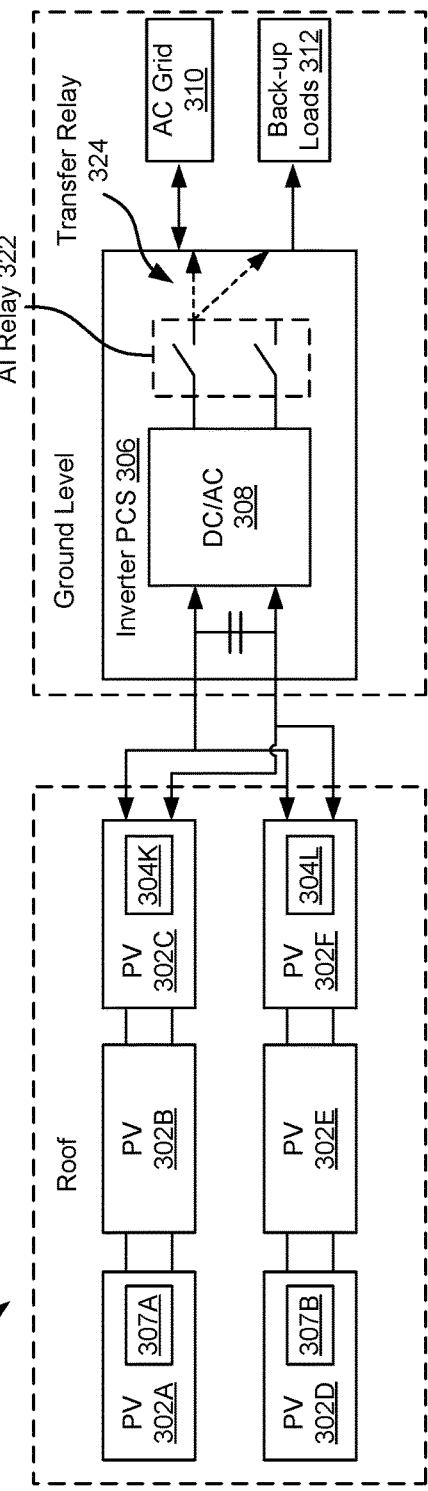
*FIG. 3B*  *FIG. 3C*

OPTIMIZER BATTERY PV ENERGY GENERATION SYSTEMS

BACKGROUND

Decreasing costs, state and federal tax incentives, the availability of solar financing, solar leases, power purchase agreements, and increased awareness of the correlation between greenhouse gasses (e.g., carbon dioxide emissions) and climate change, among other factors, have increased the popularity of photovoltaic (PV) or "solar" energy generation systems with consumers, businesses and utility companies.

A conventional solar energy generation system includes an array of PV modules connected together on one or more strings and a combination of individual component systems, such as a combiner for combining direct current (DC) outputs of the one or more strings, one or more string inverters for converting the combined DC output from the strings to alternating current (AC), and a physical interface to AC grid power—typically on the load side of the utility meter, between the meter and the customer's main electrical panel. In jurisdictions that allow for net energy metering, the solar energy generation system provides excess AC power back to the AC grid, resulting in cost benefits to the customer and/or owner of the system.

The numerous component systems in conventional solar energy generation systems and storage systems are complex to operate and relatively expensive to install. The numerous individual component systems also induce inefficiencies in power flow, often requiring several conversions of power between a power source and a load where each power conversion induces a degree of power loss. Additionally, each conventional solar energy generation system needs to be individually designed for the installation site at which it is to be installed, thereby rendering these energy generation systems inflexible in design and use. Moreover, conventional solar energy generation systems require all or some of the component systems to be positioned at ground level, resulting in unpleasing aesthetics. In light of these shortcomings of conventional solar energy generation systems, improved energy generation systems are desired.

SUMMARY

Embodiments describe PV systems configured with multiple batteries, where each battery is devoted to a particular PV module for storing energy and performing maximum power-point tracking (MPPT). Such PV systems may be referred to herein as an optimizer battery PV system, or an "Opti-battery PV system" for short. Opti-battery PV systems, when compared to conventional energy generation systems, require less individual component systems, are less complex to operate, are more efficient, are more flexible in design, and are more aesthetically pleasing when installed.

In some embodiments an energy generation system includes a photovoltaic (PV) array comprising a plurality of PV modules for generating direct current (DC) power, a plurality of Opti-battery packs coupled to the PV array, where each Opti-battery pack is coupled to a respective PV module and configured to receive DC power from the respective PV module, and an inverter configured to receive DC power from the plurality of Opti-battery packs and to convert the DC power to alternating current (AC) power.

Each Opti-battery pack may be positioned proximate to the respective PV module. In certain embodiments, each battery pack may be positioned underneath the respective PV module. Each battery pack may include a DC-to-DC buck and/or converter configured to perform MPPT on DC power from the respective PV module. The DC-to-DC converter may be a bidirectional DC-to-DC buck and/or converter configured to convert DC power from battery cells in the battery pack and/or DC power from the respective PV module. In some embodiments, the plurality of Opti-battery packs are serially connected. The inverter may include just a DC-to-AC inverter that is configured to receive power directly from the plurality of Opti-battery packs. The plurality of PV modules and the plurality of Opti-battery packs may be equal in number. Each Opti-battery pack may be coupled to a different PV module. The plurality of Opti-battery packs may be coupled to less than all PV modules of the plurality of PV modules. In particular embodiments, some PV modules of the plurality of PV modules may be coupled to respective PV optimizers. Some Opti-battery packs may be coupled to more than one PV module of the plurality of PV modules.

In some embodiments, an energy generation system includes a photovoltaic (PV) array comprising a plurality of PV modules for generating direct current (DC) power; a plurality of Opti-battery packs coupled to the PV array, where each Opti-battery pack is coupled to a respective PV module and comprises a DC-to-DC converter for performing maximum power-point tracking (MPPT) of power outputted by the respective PV module, and an inverter configured to receive DC power from the plurality of Opti-battery packs and to convert the DC power to alternating current (AC) power.

The DC-to-DC buck and/or boost converter may also be configured to convert the DC power provided by the respective PV module. The Opti-battery pack may further include battery cells and a battery management system (BMS). The DC-to-DC converter, the battery cells, and the BMS may be contained within a single enclosure. In certain embodiments, the battery cells and the BMS are contained within a separate enclosure from the DC-to-DC converter. The DC-to-DC converter may be contained in a first enclosure, and the battery cells and the BMS may be contained within a second enclosure.

In some embodiments, an energy generation system includes a photovoltaic (PV) array comprising a plurality of PV modules for generating direct current (DC) power, a plurality of Optimizers coupled to the PV array, where each Optimizer is coupled to a respective PV module and comprises a DC-to-DC converter for performing MPPT of power outputted by the respective PV module, a plurality of battery packs coupled to the plurality of Optimizers, where each battery pack is coupled to a respective Optimizer for storing power provided by the respective PV module, and an inverter configured to receive DC power from the plurality of Optimizers and to convert the DC power to alternating current (AC) power. This energy generation system may be called an Opti-battery system.

The DC-to-DC converter may also be configured to convert the DC power provided by a respective battery pack. The battery pack may further include battery cells and a battery management system (BMS). The Optimizer may include a connector for interfacing with the respective battery pack. The Optimizer and battery pack may be contained within separate enclosures.

A better understanding of the nature and advantages of embodiments of the present disclosure may be gained with reference to the following detailed description and the accompanying drawings.

BRIEF DESCRIPTION OF THE DRAWINGS

FIG. 3B illustrates a block diagram of an exemplary Opti-battery PV system where some PV modules are not coupled to an Opti-battery pack, according to embodiments of the present disclosure.

FIG. 3C illustrates a block diagram of an exemplary Opti-battery PV system where some PV modules are not coupled to an Opti-battery pack and some PV modules are coupled to PV optimizers, according to embodiments of the present disclosure.

DETAILED DESCRIPTION

An Opti-battery PV system is a PV energy generation system that implements several battery packs operating at low voltage levels, instead of a single battery pack operating at a high voltage level, to store and provide power in the energy generation system, thereby requiring less component systems, increasing power conversion efficiency, and simplifying the overall design and aesthetics of the system. Additionally, the small batteries may be configured to perform MPPT for maximizing the power output of an array of PV modules in the Opti-battery PV system.

For instance, an Opti-battery PV system may include an array of PV modules where Opti-battery packs are connected together in one or more strings. Each PV module may be coupled to an individual Opti-battery pack that is configured to store DC power generated by that respective PV module. The Opti-battery pack may have a DC-to-DC buck and/or boost converter for performing MPPT as well as managing the flow of power between the respective PV module, battery cells, and an inverter. The Opti-battery pack may be positioned on a roof of an installation site and proximate to the respective PV module, or in some embodiments, may be attached to the PV module or other hardware supporting the PV module. In some embodiments, the operating voltage of the battery pack is specifically tailored to match or be close to the output voltage (Vmp-maximum power voltage point) of the respective PV module to increase efficiencies in power flow to an efficiency percentage of at least 99% (rather than 90-94% in conventional systems and eliminate need for an additional DC-to-DC converter between the Opti-battery pack and PV module. The Opti-battery packs for each PV module in the energy generation system may be serially connected so that output voltages from the Opti-battery packs can combine to output a larger voltage as a whole to a DC-to-AC inverter for providing AC power to power an AC grid or one or more back-up loads.

I. Conventional PV Systems

To better understand the differences between an Opti-battery PV system and conventional PV systems, it may be helpful to first discuss details of conventional PV systems and subsequently discuss details of an Opti-battery PV system.

A. AC-Coupled Energy Storage System

Figure 1:
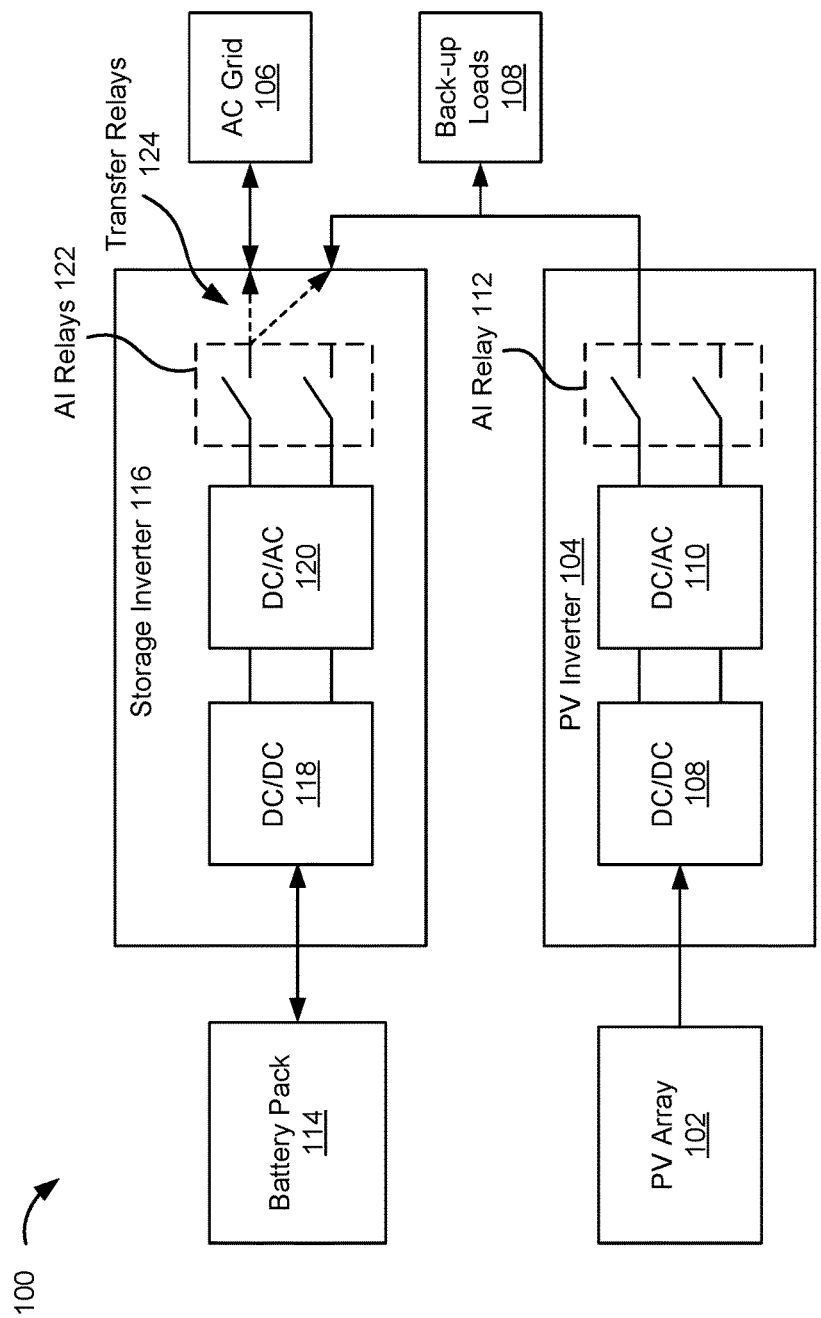
FIG. 1 illustrates a block diagram of a conventional AC-coupled PV energy storage system for generating, storing, and providing power to AC grid and back-up loads.

FIG. 1 illustrates a block diagram of conventional AC-coupled energy storage system 100 for generating, storing, and providing power. As shown, AC-coupled energy storage system 100 is a PV system that includes PV array 102 for generating DC power and PV inverter 104 for converting the generated DC power to AC power for outputting to AC grid 106 and back-up loads 108. PV array 102 may be a single PV module or an array/string of PV modules capable of generating DC voltage from photons emitted from a light source such as the Sun. Each string may comprise a plurality of PV panels (not shown) connected serially with an additive DC voltage somewhere between 100 and 1000 volts, depending on such factors as the number of panels, their efficiency, their output rating, ambient temperature and irradiation on each panel. Inverter 104 may include DC-to-DC buck and/or boost converter 108 for stepping up/down the received DC power from PV array 102 to a suitable level for inversion depending on the number of PV modules in a string, and DC-to-AC inverter 110 for converting the DC power to AC power for outputting to back-up loads 108 or to AC grid 106. In some embodiments, AC grid 106 may provide power to back-up loads 108 by routing power through storage inverter 116.

PV system 100 may also include battery pack 114 for storing and providing power. Battery pack 114 may include a DC-to-DC converter for bucking and/or boosting power provided to and/or from battery pack 114. In addition to a DC-to-DC converter, battery pack 114 may also include a battery management system (BMS). Power discharged from battery pack 114 may be provided to storage inverter 116, which may include DC-to-DC converter 118 for stepping up DC power provided by battery pack 114 to a suitable level for inversion. Alternatively, power provided by battery pack 114 may be supplied to AC grid 106 or back-up loads 108. DC-to-DC converter 118 may be an optional buck and/or boost converter that is implemented when battery pack 114 does not include a separate DC-to-DC buck and/or boost converter. In some embodiments, battery pack 114 may also include a DC-to-DC, such as in instances where the operating voltage of battery pack 114 and the interface voltage of storage inverter 116 do not match. Storage inverter 116 may also include DC-to-AC inverter 120 for converting the DC power from battery pack 114 to AC power for outputting to AC grid 106 or back-up loads 108. Transfer relays 124 may be implemented within storage inverter 116 to direct power between storage inverter 116 and either AC grid 106, back-up loads 108, or PV inverter 104. In various embodiments, when transfer relays 124 are in a first position, storage inverter 116 may provide power to and receive power from AC grid 106 through the anti-islanding (AI) relays, and when transfer relays 124 are in a second position, storage inverter 116 may provide power to back-up loads 108 or may receive AC power from PV inverter 104. In some embodiments, transfer relays 124 can be external to storage inverter 116.

Storage inverter 116 and PV inverter 104 may include anti-islanding (AI) relays 122 and 112, respectively, so that storage inverter 116 and PV inverter 104 may be electrically isolated from AC grid 106 and back-up loads 108 when respective AI relays 122 and 112 are opened. In some embodiments, PV inverter 104 could be a system with optimizers and DC/AC inverter. In some embodiments, PV inverter 104 could be a micro-inverters system.

B. DC-Coupled Energy Storage System

Figure 2:
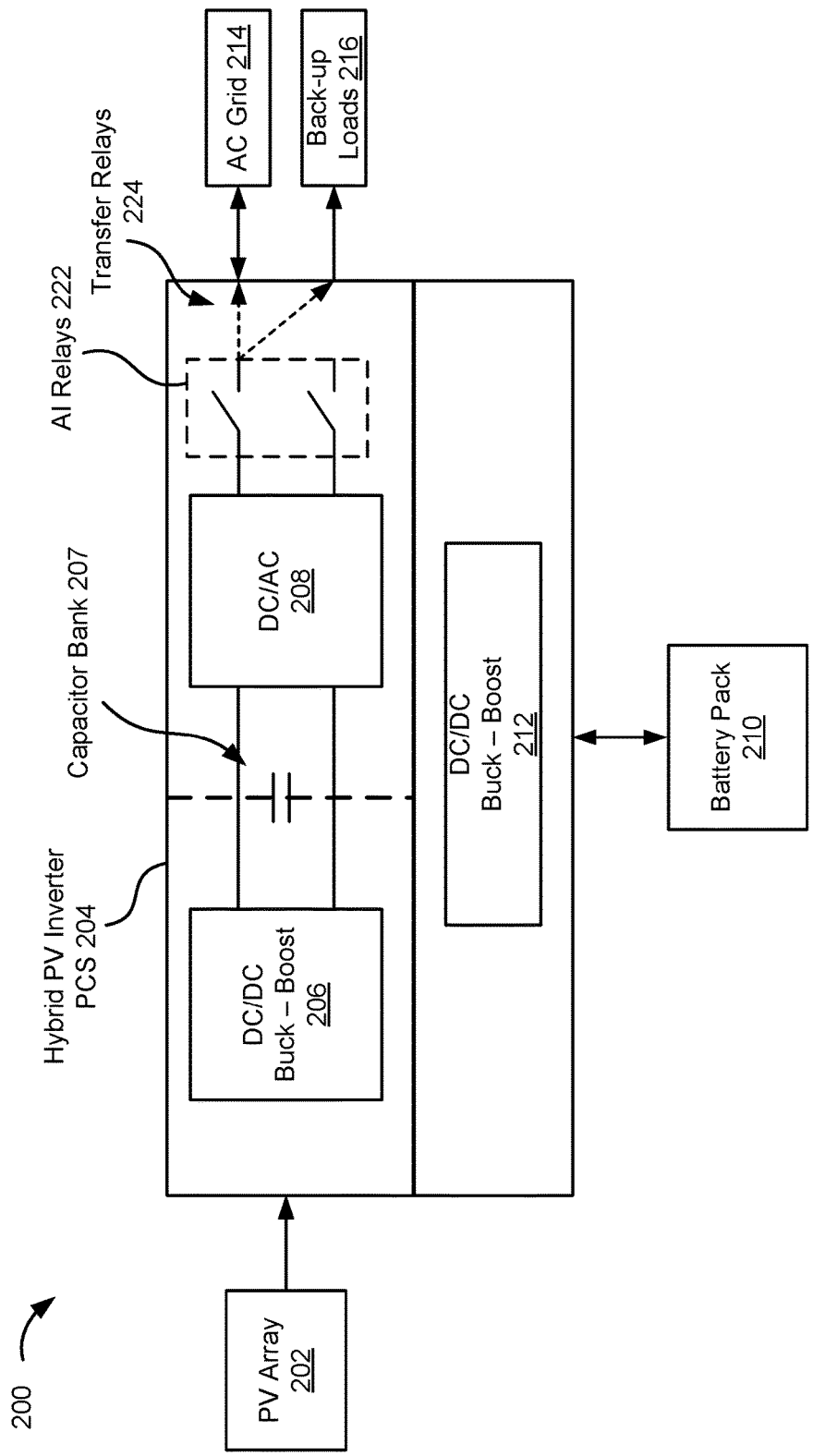
FIG. 2 illustrates a block diagram of a conventional DC-coupled PV energy storage system for generating, storing, and providing power to AC grid and back-up loads.

Another newer type of conventional PV system is a DC-coupled energy storage system as shown in FIG. 2, which illustrates a block diagram of conventional DC-coupled energy storage system 200 for generating, storing, and providing power. DC-coupled energy storage system 200 is a PV system that includes PV array 202 for generating DC power and hybrid PV inverter power control system (PCS) 204 for converting the generated DC power from PV and/or battery packs to AC power for outputting to AC grid 214 or back-up loads 216. Instead of having two separate inverters, as shown in FIG. 1, system 200 may only have a single inverter PCS that is configured to control the flow of power between DC sources, e.g., PV array 202 and battery pack 210, and output destinations, e.g., AC grid 214 and back-up loads 216. Battery pack 210 may include a DC-to-DC converter (not shown) for bucking and/or boosting power provided to and/or from battery pack 210. In addition to the DC-to-DC converter, battery pack 210 may also include a battery management system (BMS).

Hybrid inverter PCS 204 may include DC-to-DC buck and/or boost converter 206 for ensuring that the power supplied to DC-to-AC inverter 208 is sufficiently high for inversion. Hybrid inverter PCS 204 also includes a DC link bus attached to battery pack 210 so that the DC power coming from PV array 202 can be used to deliver DC power to battery pack 210. The DC link bus is represented by capacitor bank 207 shown between the two DC-to-DC converters 206 and 212 and DC-to-AC inverter 208 in FIG. 2. Battery pack 210 has a minimum and maximum associated operating voltage window. Because battery pack 210 has a maximum exposed input voltage limit that, in some cases, may be lower than the theoretical maximum DC voltage coming off of the strings (open circuit voltage), DC-to-DC buck-boost stage 212 may be implemented between the string-level PV input of hybrid inverter PCS 204 and the DC-link connection to battery pack 210. The inclusion of buck-boost circuit 212 will prevent battery pack 210 from being exposed to voltages above a safe threshold, thereby eliminating the possibility of damage to battery pack 210 from overvoltage stress. Further details of energy storage system 200 can be referenced in U.S. patent application Ser. No. 14/798,069, filed on Jul. 13, 2015, entitled "Hybrid Inverter Power Control System for PV String, Battery, Grid and Back-up Loads," which is herein incorporated by reference in its entirety for all purposes. In some embodiments, the DC-to-DC buck-boost stage 212 may be present in both battery pack 210 and hybrid inverter PCS 204.

Hybrid inverter PCS 204 may have more than one mode of operation. In some modes, no power may be flowing from PV array 202 to battery pack 210, while in other modes power may be flowing exclusively to the battery pack. In still further modes power may be flowing to a combination of battery pack 210 and AC grid 214 or back-up loads 216. As shown in FIG. 2, there are two blocks 206/212 labeled "Buck-Boost". These blocks 206/212 represent alternative embodiments. In the first embodiment, the buck-boost circuit is located in the DC-link at the PV front end of hybrid inverter PCS 204 (as depicted by block 206) so that the DC input(s) coming from PV array 202 are always subject to buck or boost, keeping the voltage at DC link bus sufficiently high level for inversion while also preventing too high of a voltage from being exposed to battery pack 210. In this embodiment, there is no need for a second buck-boost circuit anywhere else. In the second embodiment, the buck-boost circuit is located between the DC link bus of hybrid inverter PCS 204 and battery pack 210 (as depicted by block 212) such that the high voltage DC inputs from PV array 202 only go through the buck-boost whenever voltage is exposed to battery pack 210. In this alternative embodiment, there may be an additional DC-DC boost stage at the input to the inverter but no need for a second buck circuit anywhere else. Either embodiment will prevent battery pack 210 from being exposed to excessively high voltages generated by PV array 202. The combined voltage from PV array 202 could be as high as 600 Volts, or even 1000 Volts in the case of a 1 kV PV system. As shown in FIG. 2, DC-to-DC converters 206 and 212 are "buck-boost" converters, which indicates that DC-to-DC converters 206 and 212 may be buck, boost, or buck and boost converters. It is to be appreciated that DC-to-DC converters 206 and 212 are not limited to buck and boost converters only, and that any other suitable converter may be used without departing from the spirit and scope of the present disclosure.

Battery packs 114 and 210 in FIGS. 1 and 2, respectively, may each be an exemplary commercially available residential lithium-battery pack with its own battery cells and battery management system (BMS) only or a battery pack with battery cells, BMS, and its own DC-to-DC buck-boost converter, or other topologies. Alternatively, the battery cells may be a lead acid battery, advanced lead acid battery, flow battery, organic battery, or other battery type and/or battery chemistries. Battery packs 114 and 210 may have particular utility for PV systems that use high voltage battery packs (e.g., greater than 48 volts) such as 48V-1000V battery packs.

Conventional PV systems in FIGS. 1 and 2 utilize batteries that operate at a voltage substantially lower than the voltage requirements of the inverter. This requires the voltage outputted from the battery to be boosted/bucked, e.g., stepped up/down, to a higher voltage level, thereby reducing discharging/charging efficiency, respectively. For instance, a battery may operate at 48 V, but the inverter may operate at 400 V to provide enough power to operate back-up loads. Thus, a DC-to-DC converter is required to boost the voltage from 48 V to 400 V when power is flowing from the battery pack to an inverter, as well as to buck, e.g., step down, the voltage from 400 V to 48 V when power is flowing from the inverter to the battery pack during charging. The large step up and step down voltage differences result in significant power inefficiencies. Furthermore, power outputted by the PV array also needs to be boosted to the voltage requirements of the inverter. The large voltage conversions and numerous voltage conversions required to manage the flow of power for conventional PV systems creates large inefficiencies. Each time power needs to be bucked or boosted, a portion of the power inputted into the DC-to-DC converter is lost.

In addition to the power inefficiencies, conventional PV systems may be complex to design, manufacture, and operate. The complexity of conventional PV systems also decreases reliability and increases production costs. Furthermore, conventional PV systems utilize batteries that are not flexible in their design. Conventional PV systems also require a majority of the component systems to be installed on the ground level so that they are accessible to technicians, and negatively impacting the aesthetics of the installation site.

According to embodiments of the present disclosure, PV systems that implement optimizer battery packs ("Opti-battery PV systems") may mitigate such shortcomings of conventional PV systems. As will become apparent from disclosures herein, Opti-battery PV systems will enable more flexible PV system designs, have increased efficiencies, have less complexity, and be more aesthetically pleasing.

II. Opti-Battery PV System

Figure 3A:
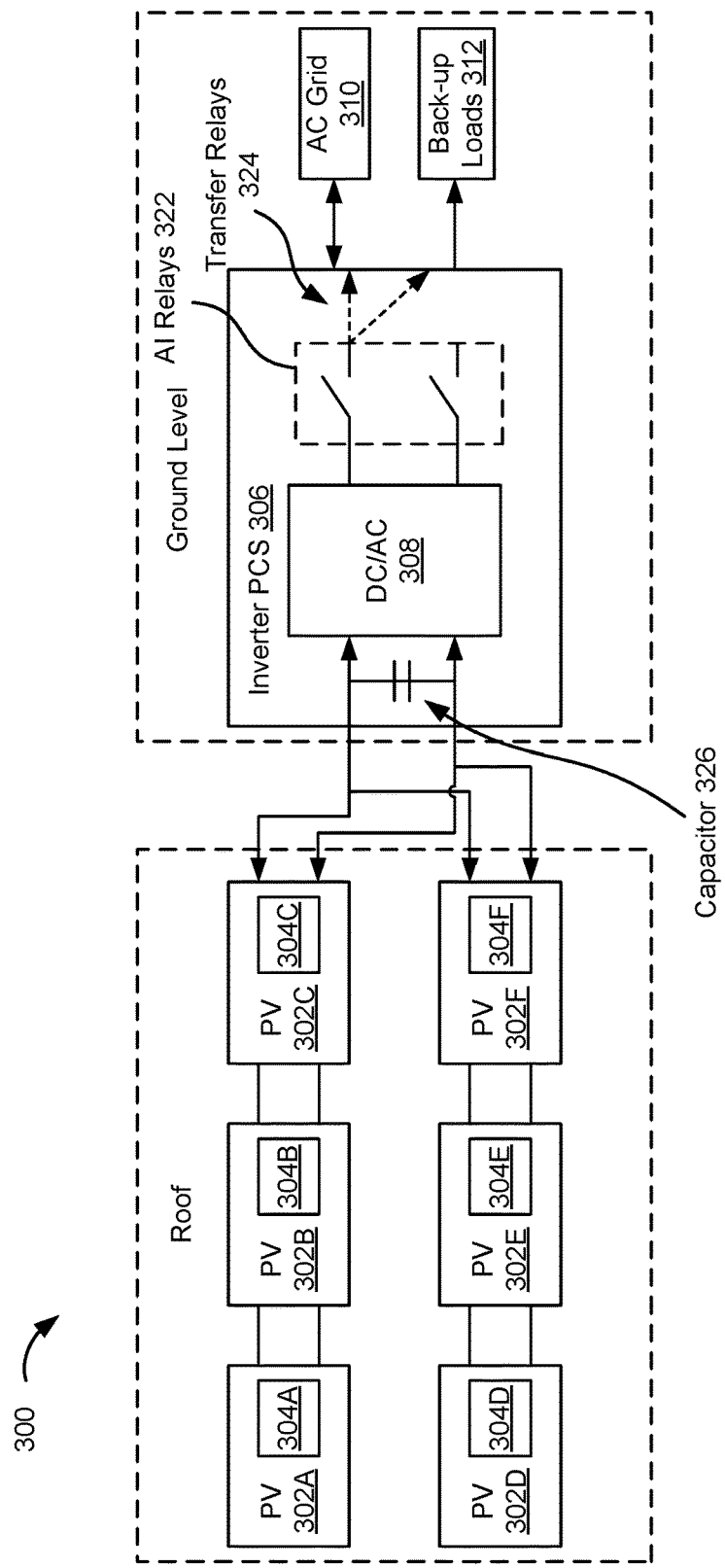
FIG. 3A illustrates a block diagram of an exemplary Opti-battery PV system, according to embodiments of the present disclosure.

An Opti-battery PV system is a PV system that includes a plurality of optimizer battery packs where, instead of a single battery pack for storing charge from an array of PV modules, several smaller sized battery packs may be implemented in the PV system, each configured to store charge from a single PV module or N PV modules (where N is an integer between 1 and 4) as well as to perform maximum power-point tracking (MPPT), as will be discussed further herein. FIG. 3A illustrates a block diagram of an exemplary Opti-battery PV system 300, according to embodiments of the present disclosure. System 300 includes an array of PV modules 302A-302F and a plurality of Opti-battery packs 304A-304F. Each Opti-battery pack 304A-304F may be coupled to respective PV modules 302A-302F. As shown in FIG. 3A, the number of Opti-battery packs 304A-304F may equal the number of PV modules 302A-302F such that each PV module 302A-302F may output DC power to a respective Opti-battery pack. Each Opti-battery pack 304A-304F may be coupled to a different respective PV module 302A-302F.

According to some embodiments of the present disclosure, each Opti-battery pack 304A-304F is an optimizer battery pack that can not only store charge from a respective PV module but also perform MPPT on power generated by the respective PV module, as will be discussed further herein with respect to FIGS. 4, 5, and 6. Power provided by PV modules 302A-302F may first be outputted to battery packs 304A-304F and then outputted from Opti-battery packs 304A-304F to inverter PCS 306. Inverter 306 may thereafter convert DC power from battery packs 304A-304F to AC power for outputting to AC grid 310, back-up loads 312, or some combination of both. Inverter 306 may include anti-islanding (AI) relays 322 and transfer relays 324. AI relays 322 may be configured to electrically disconnect DC-to-AC inverter 308 from AC grid 310 and back-up loads 312. Transfer relays 324 may be configured to direct power between inverter PCS 306 and either AC grid 310 or back-up loads 312. In some embodiments, transfer relays 324 can be external to inverter PCS 306. Additionally, inverter 306 may include capacitor 326 coupled between positive and negative power lines of the DC input.

In some embodiments, Opti-battery packs 304A-304F can be configured to operate at a voltage substantially equal or close to the output voltage of respective PV modules 304A-304F. As an example, if PV module 302A outputs a voltage of 50 V, then battery pack 304A may also operate at a voltage of approximately 50 V. Thus, a DC-to-DC converter does not have to buck or boost the output voltage of PV module 302A to a substantially different operating voltage for battery pack 304A, thereby significantly reducing inefficiencies in Opti-battery PV system 300. In some embodiments, battery pack 304A operates at the same voltage as PV module 302A such that a DC-to-DC converter is not needed at all.

The operating voltages of PV modules in the industry are not governed by a standard and thus can vary widely across different manufacturers and different specifications, whereas battery cells are governed by a standard and thus operate at specific predefined voltages, such as 3.3 V or in the range of 3 to 4.2 V for lithium-ion batteries. In embodiments, battery packs 304A-304F in Opti-battery PV system 300 can easily tailor their respective operating voltages by scaling up or down the number of its battery cells to achieve an operating voltage substantially similar to the operating voltage of PV modules 302A-302F. As an example, if PV module 302A outputs a voltage of 50 V, then battery pack 304A may include 15 lithium ion battery cells for a total operating voltage of 49.5 V. A DC-to-DC converter thus would only need to buck the output voltage of PV module 302D to 49.5V for battery pack 304A. The small difference of 0.5 V can be easily converted without resulting in significant power loss/inefficiencies usually experienced from converting between voltages of greater differences. As can be appreciated herein, unlike conventional PV systems where batteries for storing charge are large battery packs that operate at high voltages, battery packs 304A-304F may be substantially smaller in size and operate at lower voltages. These smaller battery packs may be cheaper, safer, and easier to install in PV systems than conventional larger battery packs.

According to some embodiments of the present disclosure, Opti-battery packs 304A-304F may be positioned proximate to respective PV modules 302A-302F. For instance, battery packs 304A-304F may be positioned on the roof along with PV modules 302A-302F instead of on a wall of a home at the ground level. In certain embodiments, battery packs 304A-304F may be positioned underneath respective PV modules 302A-302F so that PV modules 302A-302F may shield battery packs 304A-304F from the environment. Battery packs 304A-304F may be sealed within an enclosure and then mounted on a frame supporting PV modules 302A-302F. It is to be appreciated that battery packs 304A-304F may be mounted in any suitable configuration, as long as it is mounted on the roof and proximate to PV modules 302A-302F. Mounting battery packs 304A-304F on the roof minimizes clutter of components on the ground level, thereby improving aesthetics over conventional PV systems that position large batteries at the ground level.

Although FIG. 3A illustrates Opti-battery PV system 300 as having a battery pack for each respective PV module, embodiments are not limited to such configurations. In some alternative embodiments, not every PV module may be coupled to an Opti-battery pack. FIGS. 3B and 3C illustrate block diagrams of exemplary Opti-battery PV systems 301 and 303 where some PV modules are coupled to Opti-battery packs and other PV modules are not coupled to Opti-battery packs or are coupled to conventional PV optimizers.

In FIG. 3B, Opti-battery PV system 301 may include PV modules 302A-302F and Opti-battery packs 304G-304J, where some PV modules are not coupled to an Opti-battery pack. For instance, a string containing PV modules 302A-302C may have Opti-battery packs 304G and 304H where Opti-battery pack 304G is coupled to PV module 302A, and PV module 302C is coupled to Opti-battery pack 304H.

Additionally, Opti-battery pack 304I is coupled to PV module 302D, and PV module 302F is coupled to Opti-battery pack 304J. PV modules 302B and 302E may not be coupled to an Opti-battery pack.

In some embodiments, one or more PV modules may be coupled to PV optimizers, while one or more other PV modules are coupled to Opti-battery packs. For instance, with reference to FIG. 3C, Opti-battery PV system 303 may include Opti-battery packs 304K and 304L as well as PV optimizers 307A and 307B. Opti-battery packs 304K and 304L may be configured to support PV module 302C and 302F, respectively, while PV optimizers 307A and 307B may be configured to support PV modules 302A and 302D. PV modules 302B and 302E may not be supported by PV optimizers or Opti-battery packs. It is to be appreciated that any arrangement of Opti-battery packs, PV optimizers, and PV modules are envisioned in embodiments herein.

Figure 3D:
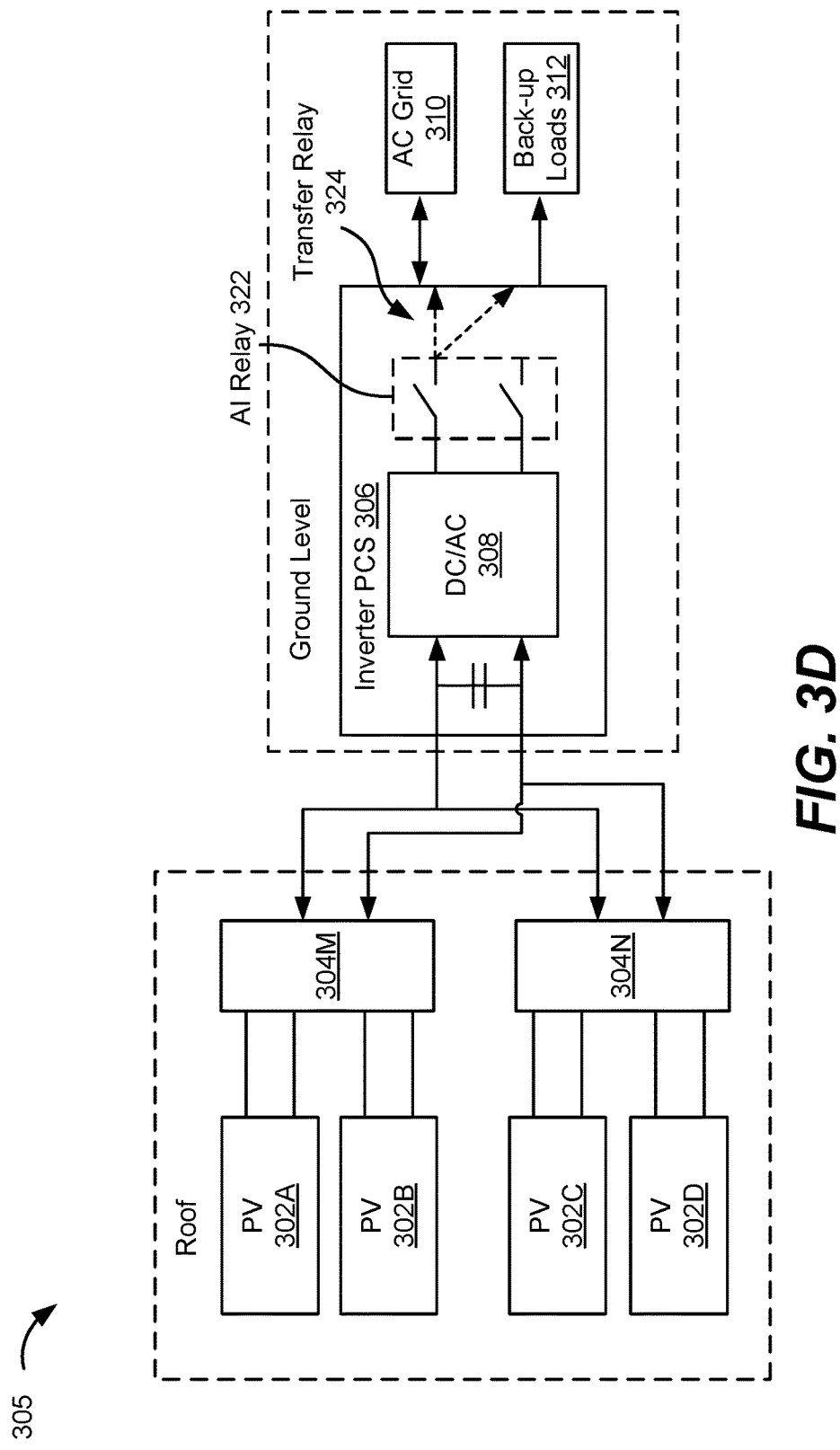
FIG. 3D illustrates a block diagram of an exemplary Opti-battery PV system where some battery packs are coupled to more than one PV module, according to embodiments of the present disclosure.

While FIGS. 3A-3C illustrate Opti-battery packs as supporting only one PV module, other embodiments may be configured such that a single Opti-battery pack may support more than one PV module. For instance, FIG. 3D illustrates a block diagram of exemplary Opti-battery PV system 305 where one or more Opti-battery packs are coupled to more than one PV module. Opti-battery PV system 305 may include PV modules 302A-302D and Opti-battery packs 304M and 304N. Each Opti-battery pack 304M and 304N may be coupled to more than one PV module. As shown in FIG. 3D, Opti-battery pack 304M may be coupled to, and configured to support, PV modules 302A and 302B. Likewise, Opti-battery pack 304N may be coupled to, and configured to support, PV modules 302C and 302D. Although FIG. 3D shows Opti-battery packs being coupled to only two PV modules, alternative embodiments may have Opti-battery packs coupled to more than two PV modules. In some embodiments, an Opti-battery pack may be configured to three, four, or an entire string of PV modules, such that the Opti-battery pack operates to support the PV modules to which it is coupled without departing from the spirit and scope of the present disclosure.

Opti-battery packs 304M and 304N may be positioned on the roof alongside the PV modules with which they support. As an example, Opti-battery pack 304M may be positioned on the roof proximate to PV modules 302A and 302B, and Opti-battery pack 304N may be positioned on the roof proximate to PV modules 302C and 302D. In alternative embodiments, Opti-battery packs 304M and 304N may be positioned at a junction point where power lines from PV modules 302A-302D converge and travel to the ground level. For example, Opti-battery packs 304M and 304N may be positioned under the roof but above the ground level.

In certain embodiments, power outputted by PV modules 302A-302F may be subject to maximum power-point tracking (MPPT) to maximize the power output of each individual PV module. MPPT may be performed by a power optimizer, such as a DC-to-DC buck-boost converter, that tracks the maximum power point of each PV module individually. According to some embodiments, the power optimizer may be incorporated as part of Opti-battery packs 304A-304F, thereby enabling Opti-battery packs 304A-304F to operate as an optimizer battery that can store charge as well as perform maximum power point tracking. In some embodiments, the optimizer battery can be charged from the AC grid.

A. Optimizer Battery Pack ("Opti Battery Pack")

According to some embodiments of the present disclosure, Opti-battery packs 304A-304F may not only store energy from a PV module, but also include a DC-to-DC converter for performing maximum power-point tracking of power outputted by PV modules 302A-302F. Each of these Opti-battery packs may be an optimizer battery pack, thus designated "Opti-battery pack" for short.

Figure 4:
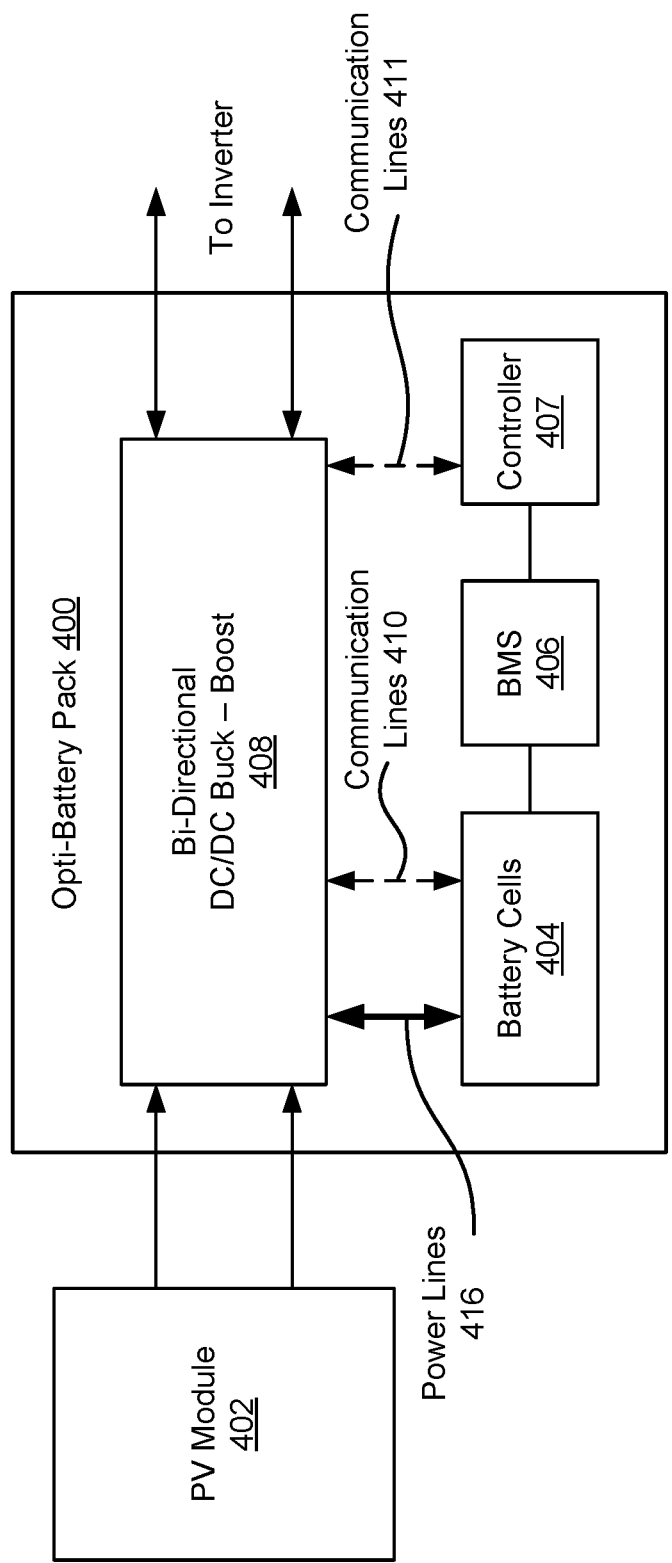
FIG. 4 illustrates a block diagram of an exemplary Opti-battery pack, according to embodiments of the present disclosure.

FIG. 4 illustrates a block diagram of exemplary Opti-battery pack 400 according to embodiments of the present disclosure. Opti-battery pack 400 may be a battery pack, e.g., any one of battery packs 304A-304F in FIG. 3A, positioned proximate to a respective PV module 402 (or any one of PV modules 302A-302F in FIG. 3A) for storing energy and/or performing maximum power-point tracking. Opti-battery pack 400 may include battery cells 404 that may be any suitable energy storage device such as a lithium-ion battery, lead-acid battery, advanced lead acid battery, flow battery, organic battery, or other battery type and/or battery chemistries. Battery cells 404 may be managed by a battery management system (BMS) 406 monitoring its state of charge and for protecting battery cells 404 from operating outside its voltage, current, and temperature range.

In some embodiments, Opti-battery pack 400 may include DC-to-DC converter 408 configured to perform MPPT of power outputted by PV module 402. Accordingly, DC-to-DC converter 408 may be a buck, a boost, or a buck and boost converter for stepping up and/or down voltage from PV module 402 for outputting to an inverter. In particular embodiments, DC-to-DC converter 408 may be a bi-directional converter so that power from battery cells 404 provided through power lines 416 may also be stepped up and/or down and provided to the inverter, and vice-versa. Thus, DC-to-DC converter 408 may be capable of providing power from PV module 402 and/or battery cells 404 to the inverter. Communication lines 410 may be provided between DC-to-DC converter 408 and battery cells 404 so that DC-to-DC converter 408 may receive information, e.g., storage capacity, state of charge, etc., from battery cells 404. Communication lines 410 and the communication between Opti-battery packs and to the inverter may be a wired (RS-485, RS-232, Modbus, CAN and the like) or wireless communication lines, such as, but not limited to, a Zigbee, radio frequency (RF), Bluetooth, Wireless Fidelity (WiFi), and power-line communication (PLC).

The operation of Opti-battery pack 400 may be operated by controller 407, which may be coupled to BMS 406 and DC-to-DC converter 408 for communication purposes. For instance, controller 407 may be coupled to BMS 406 so that controller 407 may receive information as to the stored energy state of battery cells 404. Additionally, controller 407 may be coupled to DC-to-DC converter 408 via communication lines 411 to control the operation of DC-to-DC converter 408.

As shown in FIG. 4, DC-to-DC converter 408 is configured to convert power from both PV module 402 and battery cells 404. In such embodiments, the operational voltage of PV module 402 and battery cells 404 need to be substantially similar so that DC-to-DC converter 408 can provide consistent power to the inverter. However, in some other embodiments of the present disclosure, an additional DC-to-DC converter may be incorporated in Opti-battery pack 400 so that the operational voltage of PV module 402 and battery cells 404 do not need to be substantially similar, thereby further increasing the flexibility of Opti-battery pack 400, as discussed further herein with respect to FIG. 5.

Figure 5:
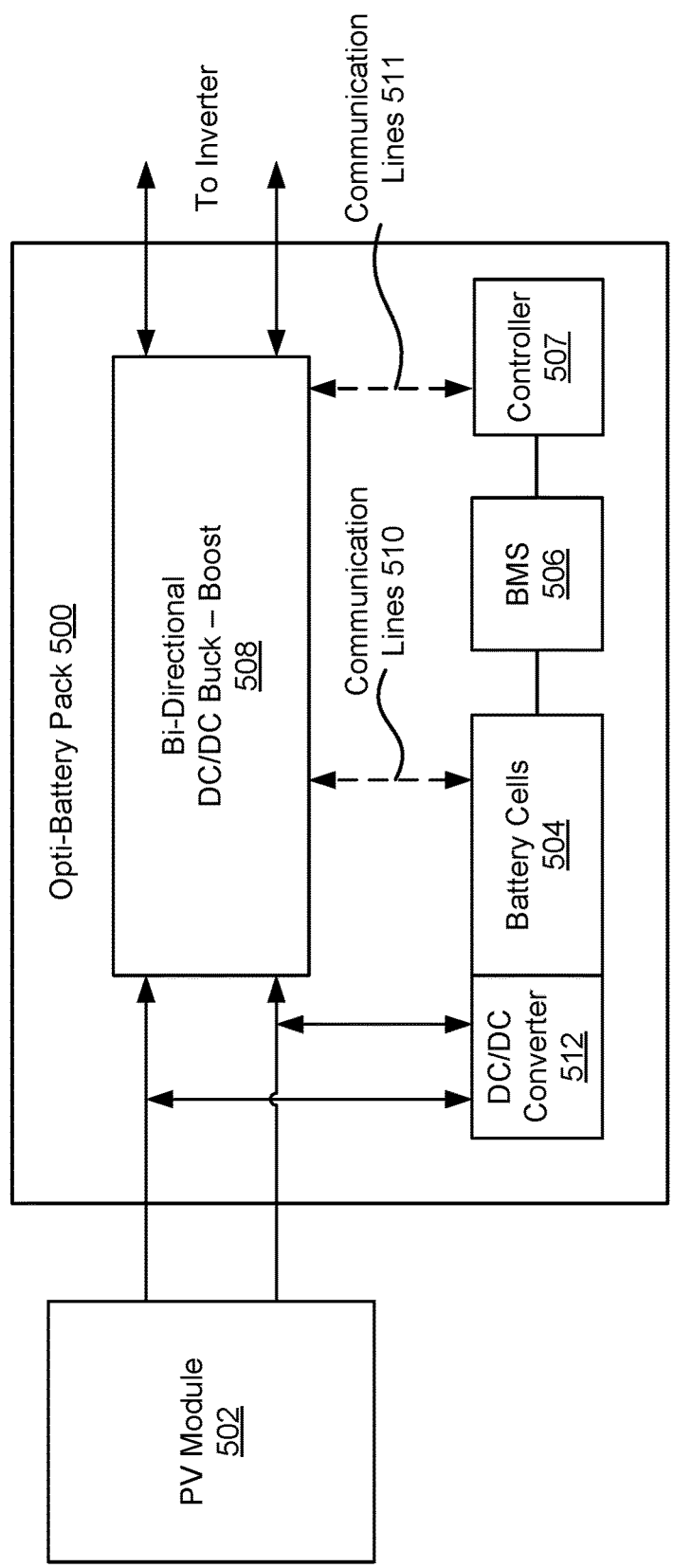
FIG. 5 illustrates a block diagram of an exemplary Opti-battery pack including an additional DC-to-DC converter, according to embodiments of the present disclosure.

FIG. 5 illustrates a block diagram of exemplary Opti-battery pack 500 including an additional DC-to-DC converter 512, according to some embodiments of the present disclosure. DC-to-DC converter 512 may be a buck, a boost, or a buck and boost converter for stepping up and/or down voltage to and from battery cells 504. In embodiments, DC-to-DC converter 512 may be devoted to converting power into and out of battery cells 504. Accordingly, power provided by PV module 502 may first pass through DC-to-DC converter 512 before being stored in battery cells 504. Likewise, power provided from DC-to-DC converter 508 (e.g., power originally provided from an AC grid) may first pass through DC-to-DC converter 512 before being stored in battery cells 504. Additionally, power provided by battery cells 504 may first be converted by DC-to-DC converter 512 before being inputted to DC-to-DC converter 508. Thus, battery cells 504 may operate at various voltages regardless of the operating voltage of PV module 502. As a result, the configuration of Opti-battery 500 may be very flexible and can be implemented in any PV system without having to modify its battery cells or the PV modules of that PV system.

Similar to Opti-battery pack 400, Opti-battery pack 500 may also include a BMS 506 and communication lines 510. BMS 506 may be configured to prevent battery cells 504 from operating outside their voltage, current, and temperature range and monitoring their state of charge. Communication lines 510 may be wired or wireless communication lines that are provided between DC-to-DC converter 508 and battery cells 504 so that DC-to-DC converter 508 may receive information, e.g., storage capacity, state of charge, etc., from battery cells 504.

As shown in FIGS. 4 and 5, the battery cells, BMSs, and DC-to-DC converters of the respective Opti-battery packs are electronic systems that may be contained within a single enclosure (illustrated by the components being contained within a single block). The enclosure may protect the internal components of the Opti-battery packs from the environment. Additionally, the enclosure may enable the Opti-battery packs to be separately mounted underneath a PV module. It is to be appreciated, however, that embodiments are not limited to such configurations and that other embodiments may have some components of the Opti-battery packs that are not contained within the same enclosure. For instance, the DC-to-DC converter of an Opti-battery pack may be contained within a separate enclosure from the battery cell and/or the BMS, as shown in FIG. 6 as Opti-battery system 600.

Figure 6:
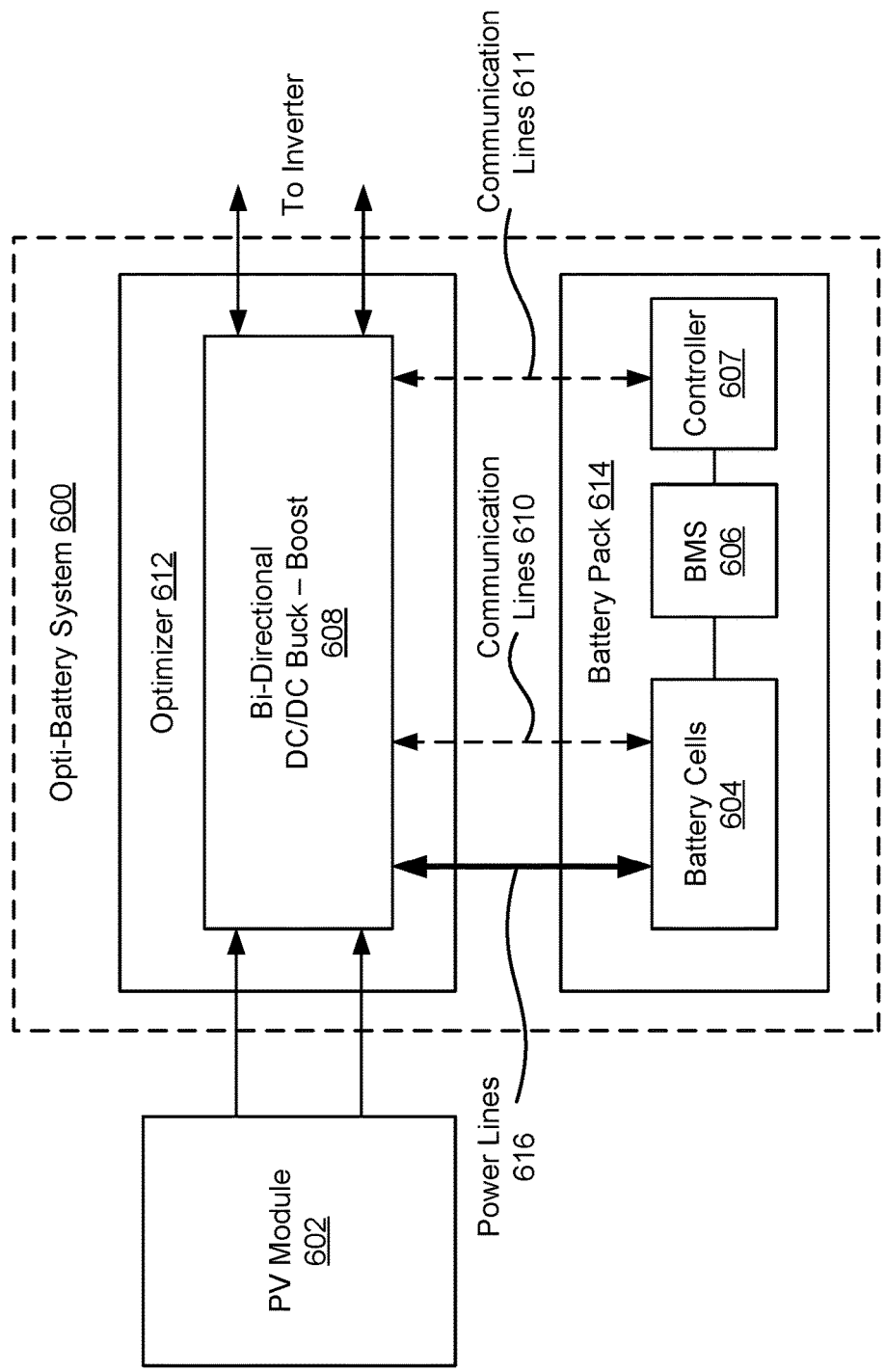
FIG. 6 illustrates a block diagram of an exemplary Opti-battery pack including an optimizer and battery pack that are each contained within separate enclosures, according to embodiments of the present disclosure.

FIG. 6 illustrates a block diagram of Opti-battery system 600 including optimizer 612 and battery pack 614. Optimizer 612 may be any suitable optimizer for performing MPPT of power from PV module 602. As an example, optimizer 612 may be a generic optimizer that can be purchased from a retailer. According to some embodiments of the present disclosure, the generic optimizer may be modified to have an extra terminal for allowing power to flow to and from battery pack 614 so that the generic optimizer may be converted to an Opti-battery, e.g., Opti-battery system 600. Battery pack 614 may be a part of Opti-battery system 600, and may include battery cells 604 that are managed by BMS 606. Additionally, battery pack 614 may include a DC-to-DC buck, boost, or buck and boost converter (not shown) for stepping up/down power provided to and from battery cells 604. The enclosures may be represented by the individual blocks within which the respective components are contained. Optimizer 612 may include a DC-to-DC converter 608 for performing functions similar to DC-to-DC converter 408 in FIG. 4.

As shown in FIG. 6, optimizer 612 and battery pack 614 may be contained within separate enclosures. Optimizer 612 may have its own enclosure for housing DC-to-DC converter 608; and battery pack 614 may have its own enclosure for housing battery cells 604 and BMS 606. In some embodiments, battery pack 614 is positioned proximate to optimizer 612. As an example, battery pack 614 may be positioned on a roof of an installation site, e.g., a home or an office building, and positioned underneath a respective PV module. Power lines 616 may be a power cable for providing an avenue through which power may flow between DC-to-DC converter 608 in optimizer 612 and battery cells 604 in battery pack 614. In some embodiments, an additional DC-to-DC converter (not shown) may be implemented in battery pack 614 for converting power to and from battery cells 604, as discussed herein with respect to DC-to-DC converter 512 in FIG. 5.

B. Connection of Opti-Battery Packs

Power from the Opti-battery packs may be interconnected for outputting power to a DC-to-AC inverter for outputting AC power to an AC grid or back-up loads. In some embodiments, individual output voltages from the battery packs may aggregate and combine to output a larger voltage to the inverter by the mere virtue of their connection with one another and without having to use a separate DC-to-DC converter to step up the output voltages of the battery packs. For instance, in some embodiments, the battery packs may be arranged in a serial connection as shown in FIG. 7.

Figure 7:
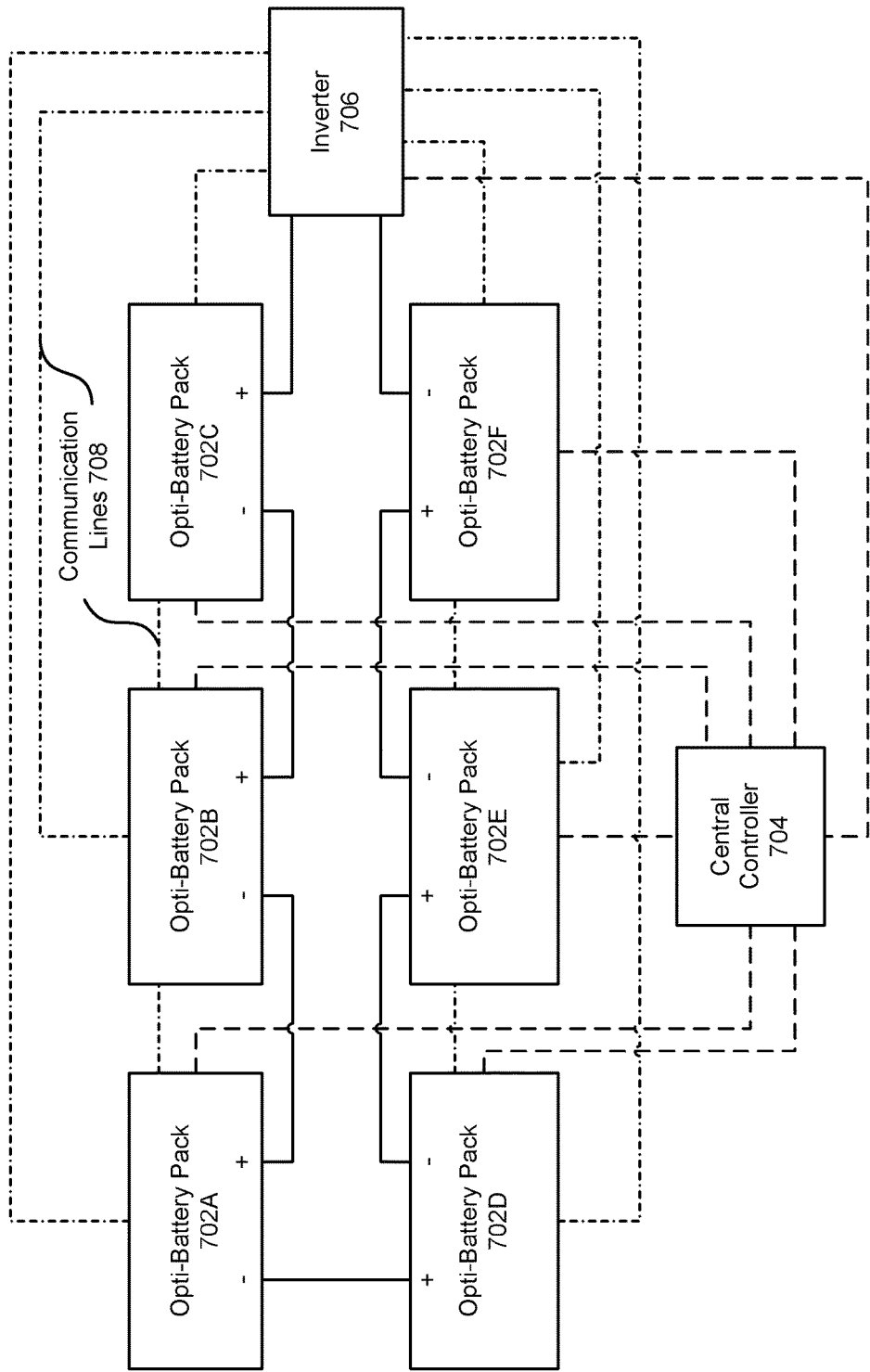
FIG. 7 illustrates a block diagram of the interconnection between Opti-battery packs for an Opti-battery PV system, according to embodiments of the present disclosure.

FIG. 7 illustrates a block diagram of Opti-battery packs 702A-702F for an Opti-battery PV system, such as Opti-battery PV system 300 in FIG. 3A, according to some embodiments of the present disclosure. Each battery pack 702A-702F may be positioned proximate to a respective PV module (not shown), similar to the position of battery packs 304A-304F with respect to PV modules 302A-302F in FIG. 3A. Furthermore, each Opti-battery pack 702A-702F may include a DC-to-DC converter, battery cells, and a BMS, such as Opti-battery packs 400 and 500 and Opti-battery system 600 in FIGS. 4, 5, and 6, respectively, for storing power and performing MPPT.

As shown in FIG. 7, battery packs 702A-702F may be coupled together in a serial circuit arrangement such that positive and negative terminals for each battery pack are coupled to opposite polarities of adjacent battery packs. As an example, the positive terminal of battery pack 702F may be coupled to the negative terminal of battery pack 702E, whose positive terminal is coupled to the negative terminal of battery pack 702D, and so on and so forth. Accordingly, voltage provided by each battery pack 702A-702F may be aggregated into a larger voltage by virtue of the serial connection. By connecting battery packs 702A-702F in this serial arrangement, the output voltage of the system is greater than the output of each battery pack individually. Thus, the output voltage of each battery pack is naturally stepped up by the mere nature of the serial connection, and an additional DC-to-DC converter, such as DC-to-DC converters 108 and 206 in FIGS. 1 and 2, are not needed in inverter 706 to step up voltage from Opti-battery system 700. Accordingly, an Opti-battery PV system, e.g., system 300 in FIG. 3A, does not require an additional DC-to-DC converter in inverter PCS 306. Such PV systems require fewer components, are less complex to operate, and have less voltage conversions, which increases efficiency and lowers cost.

In some embodiments, Opti-battery PV systems of multiple strings may be connected in parallel to provide more current/power to inverter 706 using a string combiner or similar methods. In some embodiments, Opti-battery packs 702A-702F are only present with some of the PV modules and rest of the modules may have nothing or generic PV optimizers. This is very helpful for customizing the cumulative battery capacity of each customer. Although FIG. 7 illustrates only a single string of Opti-battery packs 702A-702F for a corresponding string of PV modules, embodiments are not so limited. Other embodiments may have more strings or have strings with more or less Opti-battery packs and corresponding PV modules without departing from the spirit and scope of the present disclosure.

In certain embodiments, the operation of Opti-battery packs 702A-702F may be managed by a separate device. For instance, central controller 704 may manage the operation of Opti-battery packs 702A-702F. Central controller 704 may be communicatively coupled to each Opti-battery pack 702A-702F so that controller may send instructions to, and receive status information from, each Opti-battery pack 702A-702F. Additionally, central controller 704 may be communicatively coupled to inverter 706 to receive and send instructions and/or status information regarding the operation of Opti-battery packs 702A-702F. Central controller 704 may be coupled to Opti-battery packs 702A-702F and inverter 706 via wired (e.g., RS-485, RS-232, Modbus, CAN and the like) or wireless (e.g., PLC (power-line communication), Zigbee, RF, Bluetooth, WiFi, and the like) communication lines. In certain embodiments, central controller 704 may be any suitable device capable of managing the operation of other devices. For instance, central controller 704 may be a processor, microcontroller, application specific integrated circuit (ASIC), field-programmable logic array (FPGA), and the like. Although FIG. 7 illustrates central controller 704 as being a separate device, embodiments are not so limited. As an example, central controller 704 may be incorporated within inverter 706 in some embodiments. In additional or alternative embodiments, each Opti-battery pack may communicate with adjacent Opti-battery packs or PV optimizers and to the inverter via a plurality of communication lines 708 represented by dotted and dashed lines, so that when the controller cannot communicate with all of the Opti-battery packs, then the nearest Opti-battery pack may provide a communication channel connection. In some embodiments where central controller 704 is too far for one of Opti-battery packs 702A-702F to communicate with central controller 704, then Opti-battery packs 702A-702F may form a mesh network to communicate with one another.

III. Method of Operating an Opti-Battery PV System

Figure 8:
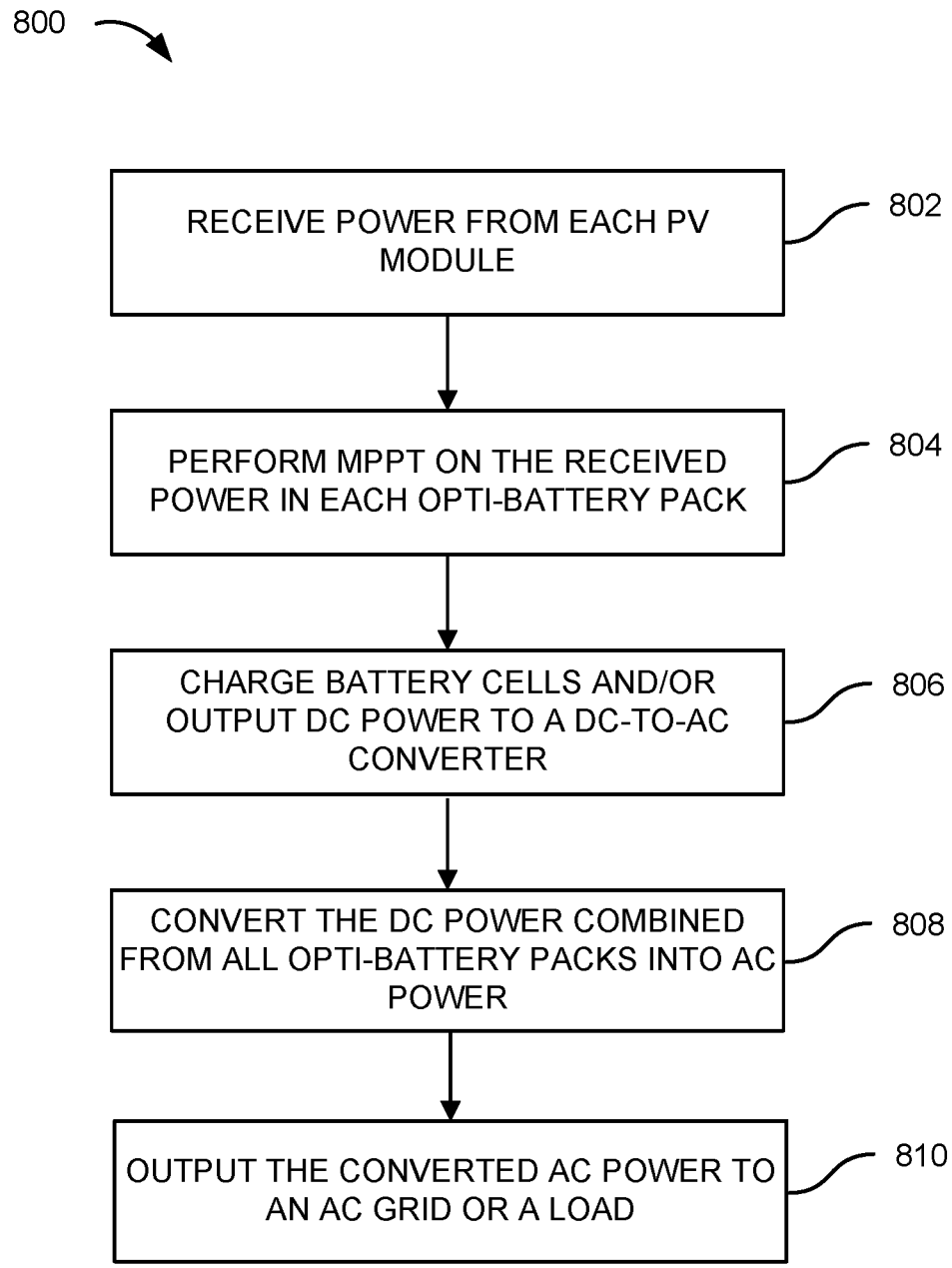
FIG. 8 is a flow chart illustrating a method for operating an Opti-battery PV energy generation system, according to embodiments of the present disclosure.

FIG. 8 is a flow chart detailing steps of a method 800 for operating an Opti-battery PV system, e.g., Opti-battery PV system 300 in FIG. 3A, according to embodiments of the present disclosure. At block 802, power may be received from each PV module. For example, an Opti-battery pack, e.g., any one of Opti-battery packs 304A-304F in FIG. 3A, may receive DC power outputted by a respective PV module, e.g., any one of PV modules 302A-302F. Specifically, a DC-to-DC converter in the Opti-battery pack may receive DC power from the respective PV module. In some embodiments, the DC-to-DC converter may also receive power from battery cells within the Opti-battery pack. In yet other embodiments, power may only be received from battery cells in the Opti-battery pack, such as during the nighttime and the respective PV module is not generating power. The Opti-battery pack may be one of a plurality of Opti-battery packs, where each Opti-battery pack receives power from one or more different PV modules.

At block 804, MPPT may be performed on the received power in each Opti-battery pack. As an example, the DC-to-DC converter within the Opti-battery pack, e.g., DC-to-DC converter 408 in Opti-battery pack 400 in FIG. 4, may perform MPPT on DC power received from the respective PV module. At block 806, DC power may either be outputted to battery cells in the Opti-battery pack to store for later use, or outputted to a DC-to-AC inverter. In some embodiments, the DC power outputted to the DC-to-AC inverter is the combined DC power from a plurality of Opti-battery packs in an Opti-battery PV system. For instance, the outputted DC power may be the combined DC power from battery packs 304A-304F in FIG. 3A. The Opti-battery packs may be arranged in a serial connection, such as battery packs 702A-702F in FIG. 7, so that the combined DC power is greater than the DC power outputted by each individual battery pack. The DC-to-AC inverter may be a DC-to-AC inverter in an inverter PCS, such as inverter DC-to-AC inverter 308 in inverter PCS 306 in FIG. 3A.

At block 808, the combined DC power may be converted to AC power. For instance, the DC-to-AC inverter may convert the combined DC power received from the plurality of Opti-battery packs into AC power. At block 810, the converted AC power may be outputted to an AC grid or a load(s), such as AC grid 310 or back-up loads 312. In some embodiments, power may flow from AC grid to the Opti-battery packs for charging through the inverter PCS. This is especially helpful for time-of-use or economic dispatch of energy usage or peak shaving applications.

It should be appreciated that the specific steps illustrated in FIG. 8 provide a particular method 800 of operating an Opti-battery PV system, according to certain embodiments of the present disclosure. Other sequences of steps may also be performed according to alternative embodiments. For example, alternative embodiments of the present disclosure may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Although the disclosure has been described with respect to specific embodiments, it will be appreciated that the disclosure is intended to cover all modifications and equivalents within the scope of the following claims.

What is claimed is:

1. An energy generation system, comprising:
 a photovoltaic (PV) array comprising a plurality of PV modules for generating direct current (DC) power, wherein each PV module is a PV panel;
 a plurality of Opti-battery packs coupled to the PV array, wherein each Opti-battery pack is coupled to a respective PV module and configured to receive DC power from the respective PV module, and wherein each Opti-battery pack is coupled to a different PV module; and
 an inverter configured to receive DC power from the plurality of Opti-battery packs and to convert the DC power to alternating current (AC) power.

2. The energy generation system of claim 1, wherein each Opti-battery pack is positioned proximate to the respective PV module.

3. The energy generation system of claim 2, wherein each Opti-battery pack is positioned underneath the respective PV module.

4. The energy generation system of claim 1, wherein each Opti-battery pack includes a DC-to-DC converter configured to perform maximum power-point tracking (MPPT) on DC power from the respective PV module.

5. The energy generation system of claim 4, wherein the DC-to-DC converter is a bidirectional DC-to-DC converter configured to convert DC power from battery cells in the Opti-battery pack and DC power from the respective PV module.

6. The energy generation system of claim 1, wherein the plurality of Opti-battery packs are serially connected.

7. The energy generation system of claim 1, wherein the plurality of PV modules and the plurality of Opti-battery packs are equal in number.

8. The energy generation system of claim 1, wherein the plurality of Opti-battery packs are coupled to less than all PV modules of the plurality of PV modules.

9. The energy generation system of claim 1, wherein some PV modules of the plurality of PV modules are coupled to respective PV optimizers.

10. An energy generation system, comprising:
   a photovoltaic (PV) array comprising a plurality of PV modules for generating direct current (DC) power, wherein each PV module is a PV panel;
   a plurality of Opti-battery packs coupled to the PV array, wherein each Opti-battery pack is coupled to a respective PV module and comprises a DC-to-DC converter for performing maximum power-point tracking (MPPT) of power outputted by the respective PV module, and wherein each Opti-battery pack is coupled to a different PV module; and
   an inverter configured to receive DC power from the plurality of Opti-battery packs and to convert the DC power to alternating current (AC) power.

11. The energy generation system of claim 10, wherein the DC-to-DC converter is also configured to convert the DC power provided by the respective PV module.

12. The energy generation system of claim 10, wherein the Opti-battery pack further comprises battery cells and a battery management system (BMS).

13. The energy generation system of claim 12, wherein the DC-to-DC converter, the battery cells, and the BMS are contained within a single enclosure.

14. The energy generation system of claim 12, wherein the battery cells and the BMS are contained within a separate enclosure from the DC-to-DC converter.

15. An energy generation system, comprising:
   a photovoltaic (PV) array comprising a plurality of PV modules for generating direct current (DC) power, wherein each PV module is a PV panel;
   a plurality of Optimizers coupled to the PV array, wherein each Optimizer is coupled to a respective PV module and comprises a DC-to-DC converter for performing maximum power-point tracking (MPPT) of power outputted by the respective PV module, and wherein each Optimizer is coupled to a different PV module;
   a plurality of Opti-battery packs coupled to the plurality of Optimizers, wherein each Opti-battery pack is coupled to a respective Optimizer for storing power provided by the respective PV module, and wherein each Opti-battery pack is coupled to a different Optimizer; and
   an inverter configured to receive DC power from the plurality of Optimizers and to convert the DC power to alternating current (AC) power.

16. The method of claim 15, wherein the DC-to-DC converter is also configured to convert the DC power provided by a respective Opti-battery pack.

17. The method of claim 15, wherein the Opti-battery pack further comprises battery cells and a battery management system (BMS).

18. The method of claim 15, wherein the Optimizer comprises a connector for interfacing with the respective Opti-battery pack.

* * * * *